(12) United States Patent
Kwak et al.

(10) Patent No.: US 6,559,904 B1
(45) Date of Patent: May 6, 2003

(54) LIQUID CRYSTAL DISPLAY WITH HIGH APERTURE RATIO

(75) Inventors: Dong Yeung Kwak, Daeku-shi (KR); Gun Hee Lee, Kyungsangbuk-do (KR); Kwang Sup Park, Kyungsangbuk-do (KR)

(73) Assignee: LG Philips LCD CO, Ltd., Seoul (KR)

( * ) Notice: Subject to any disclaimer, the term of this patent is extended or adjusted under 35 U.S.C. 154(b) by 85 days.

(21) Appl. No.: 09/702,885

(22) Filed: Nov. 1, 2000

(51) Int. Cl.[7] .................................. G02F 1/736
(52) U.S. Cl. .................. 349/43; 349/143; 349/139
(58) Field of Search ......................... 349/43, 38, 39, 349/143, 139

(56) References Cited

U.S. PATENT DOCUMENTS 5,936,685 A  *  8/1999  Ito et al. ................... 349/38
5,986,723 A  * 11/1999  Nakamura et al. ......... 349/43
6,249,325 B1 *  6/2001  Ohkawata et al. ......... 349/38
6,326,641 B1 * 12/2001  Choi ......................... 349/38

FOREIGN PATENT DOCUMENTS

JP           10153799          6/1998

* cited by examiner

Primary Examiner—James Dudek
(74) Attorney, Agent, or Firm—Birch, Stewart, Kolasch & Birch, LLP

(57) ABSTRACT

A liquid crystal display device having a high aperture ratio is disclosed. In the device, each side of a pixel electrode consists a portion overlapping with a data wire and a portion spaced from the data wire in such a manner that overlapping areas at both sides of the data wire are equal to each other. Accordingly, an aperture ratio can be improved.

13 Claims, 5 Drawing Sheets

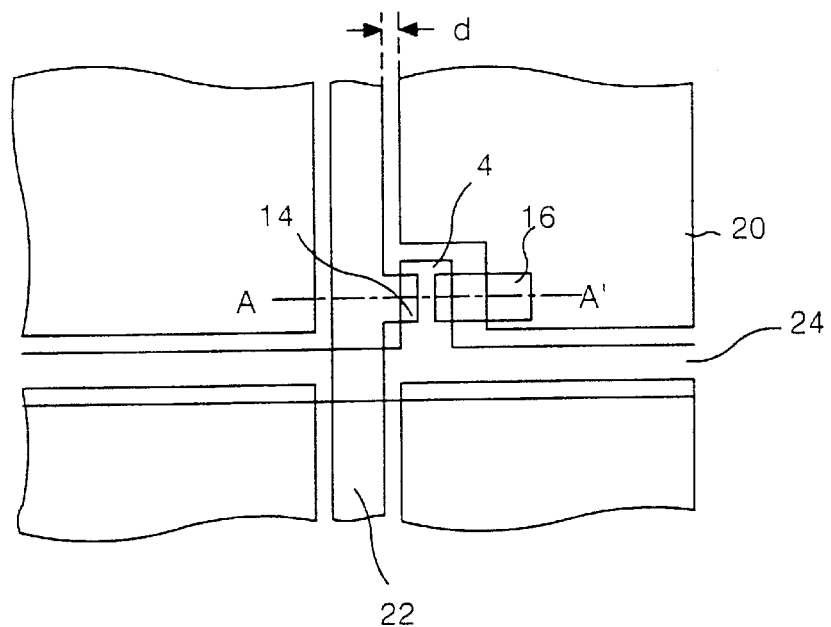
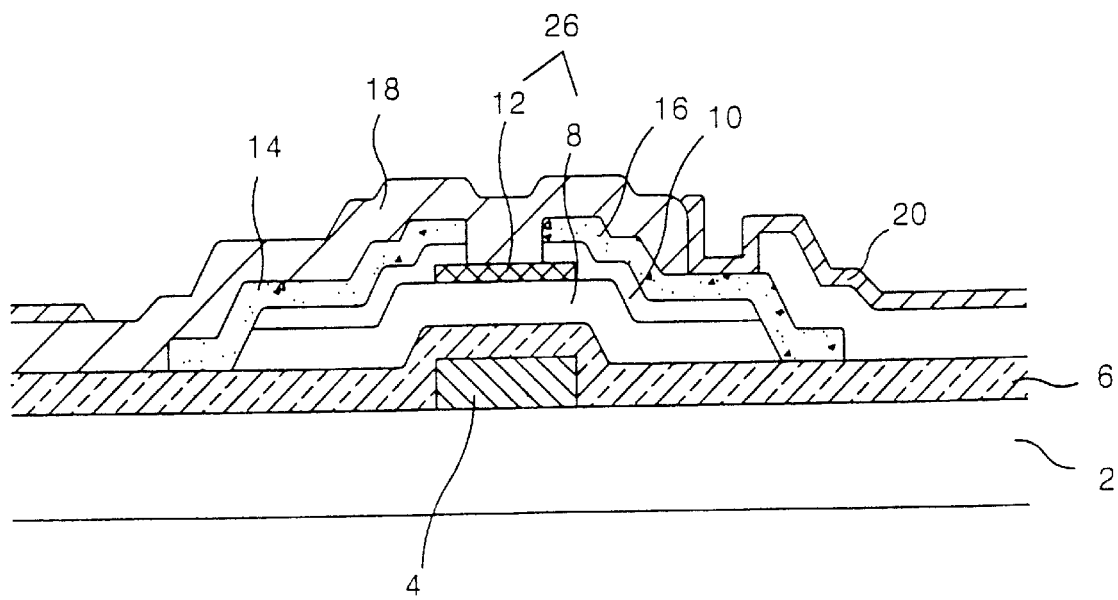

LIQUID CRYSTAL DISPLAY WITH HIGH APERTURE RATIO

BACKGROUND OF THE INVENTION

1. Field of the Invention

This invention relates to a liquid crystal display, and more particularly to a liquid crystal display with a high aperture ratio that is adapted to increase an aperture ratio.

2. Description of the Related Art

Generally, a liquid crystal display (LCD) tends toward wider applications by virtue of its characteristics such as light weight, thin thickness and low power driving, etc. Accordingly, the LCD has been used for office automation equipment and video/audio equipment, etc. The LCD controls a transmitted amount of a light beam in response to a data signal applied to a plurality of control switches arranged in a matrix type to display a desired picture on the screen.

Referring to FIG. 1, the conventional LCD includes a source electrode 14 branched from a data wire 22 to apply an image signal, a gate electrode 4 branched from a gate wire 24 to apply a scanning signal, and a drain electrode 16 for applying a data signal to a pixel electrode 20. A number of data wires 22 are provided in a vertical direction on a substrate 2 to transmit a data signal applied from a data driver (not shown) to each source electrode 14. A number of gate wires 24 are provided in a horizontal direction on the substrate 2 in such a manner so as to cross each data wire 22 to transmit a scanning signal applied from a gate driver (not shown) to each gate electrode 4. At this time, a scanning signal transmitted from the gate wire 24 is applied to the gate electrode 4 to transmit a data signal to the drain electrode 16. In other words, the gate electrode 4 switches the data signal in response to the scanning signal. The data signal transmitted to the drain electrode 16 in this manner is applied to the pixel electrode 20 to control a transmitted amount of a light beam.

Hereinafter, a thin film transistor (TFT) provided at each intersection between each data wire 22 and each gate wire 24 will be described with reference to FIG. 2. As shown in FIG. 2, the TFT includes a gate electrode 4 provided at the upper portion of the substrate 2 to apply a scanning signal, an active layer 26 provided to transmit a data signal in response to the scanning signal, a gate insulator 6 for electrically isolating the active layer 26 from the gate electrode 4, a source electrode 14, a drain electrode 16 for applying a data signal to the. pixel electrode 20, and a protective film 18 for protecting the source electrode 14 and the drain electrode 16.

The active layer 26 consists of a semiconductor layer 8 formed by vapor-depositing an amorphous silicon (a-Si), and ohmic contact layers 10 formed by vapor-depositing a n+ a-Si at both upper portions of the semiconductor layer 8. A stopper layer 12 is provided between the ohmic contact layers 10 to electrically isolate the ohmic contact layers 10 from each other. Since a channel allowing electrons to be moved therethrough is formed in the active layer 26 when a scanning signal with a high level is applied to the gate electrode 4, a data signal at the source electrode 14 is transmitted, via the active layer 26, to the drain electrode 16. On the other hand, since the channel formed in the active layer is shut off when a scanning signal with a low level is applied to the gate electrode 4, the transmission of a data signal to the drain electrode 16 is stopped. The protective film 18 plays a role to protect the source electrode 14 and the drain electrode 16 as well as to electrically isolate the pixel electrode from the data wire 22. In this case, the protective film 18 has a high dielectric constant resulting in cross talk. For instance, $SiN_x$ used as a protective film of amorphous silicon, has a certain dielectric constant (e.g., 6.4 to 6.6) to generate coupling between the pixel electrode 20 and the data wire 22, thereby causing cross talk. In order to solve this problem, the data wire 22 and the pixel electrode 20 are spaced by a desired distance d (e.g., 3 to 5 $\mu$m) from each other as shown in FIG. 1. It is desirable that the pixel electrode is made from an indium thin oxide (ITO) to transmit a light beam. In this case, a light beam progressing from a light-guide plate (not shown) into the substrate 2 is transmitted at an area provided with the pixel electrode 29 while being shut off at the other area. In other words, a light beam is shut off at an area corresponding to the space between the pixel electrode 20 and the data wire 22. As a result, the conventional LCD has a problem in that an aperture ratio is deteriorated.

SUMMARY OF THE INVENTION

Accordingly, it is an object of the present invention to provide a liquid crystal display with a high aperture ratio that is adapted to heighten an aperture ratio.

In order to achieve these and other objects of the invention, a liquid crystal display device with a high aperture ratio according to an embodiment of the present invention includes a pixel electrode having one side thereof consisting of a portion overlapping with a data wire and a portion spaced from the data wire in such a manner that overlapping areas at both sides of the data wire is equal to each other.

A liquid crystal display device with a high aperture ratio according to another embodiment of the present invention includes a data wire formed to alternately have a first width and a second width; pixel electrodes formed in such a manner so as to be overlapped by a desired distance at both sides of the data wire having the first width and to be spaced by a desired distance at both sides of the data wire having the second width.

A liquid crystal display device with a high aperture ratio according to still another embodiment of the present invention includes a data wire formed to be shifted by a desired distance to the left from a reference line and to be shifted by a desired distance to the right from the reference line; a first pixel electrode formed in such a manner so as to overlap with the data wire shifted to the left by a desired distance and to be spaced by a desired distance from the data wire shifted to the right; and a second pixel electrode formed in such a manner so as to be spaced by a desired distance from the data wire shifted to the left and to overlap with the data wire shifted to the right by a desired distance.

BRIEF DESCRIPTION OF THE DRAWINGS

These and other objects of the invention will be apparent from the following detailed description of the embodiments of the present invention with reference to the accompanying drawings, in which:

FIG. 1 is a plan view showing the structure of a conventional liquid crystal display;

FIG. 2 is a sectional view of the liquid crystal display taken along the A–A' line in FIG. 1;

DETAILED DESCRIPTION OF THE PREFERRED EMBODIMENT

Figure 3:
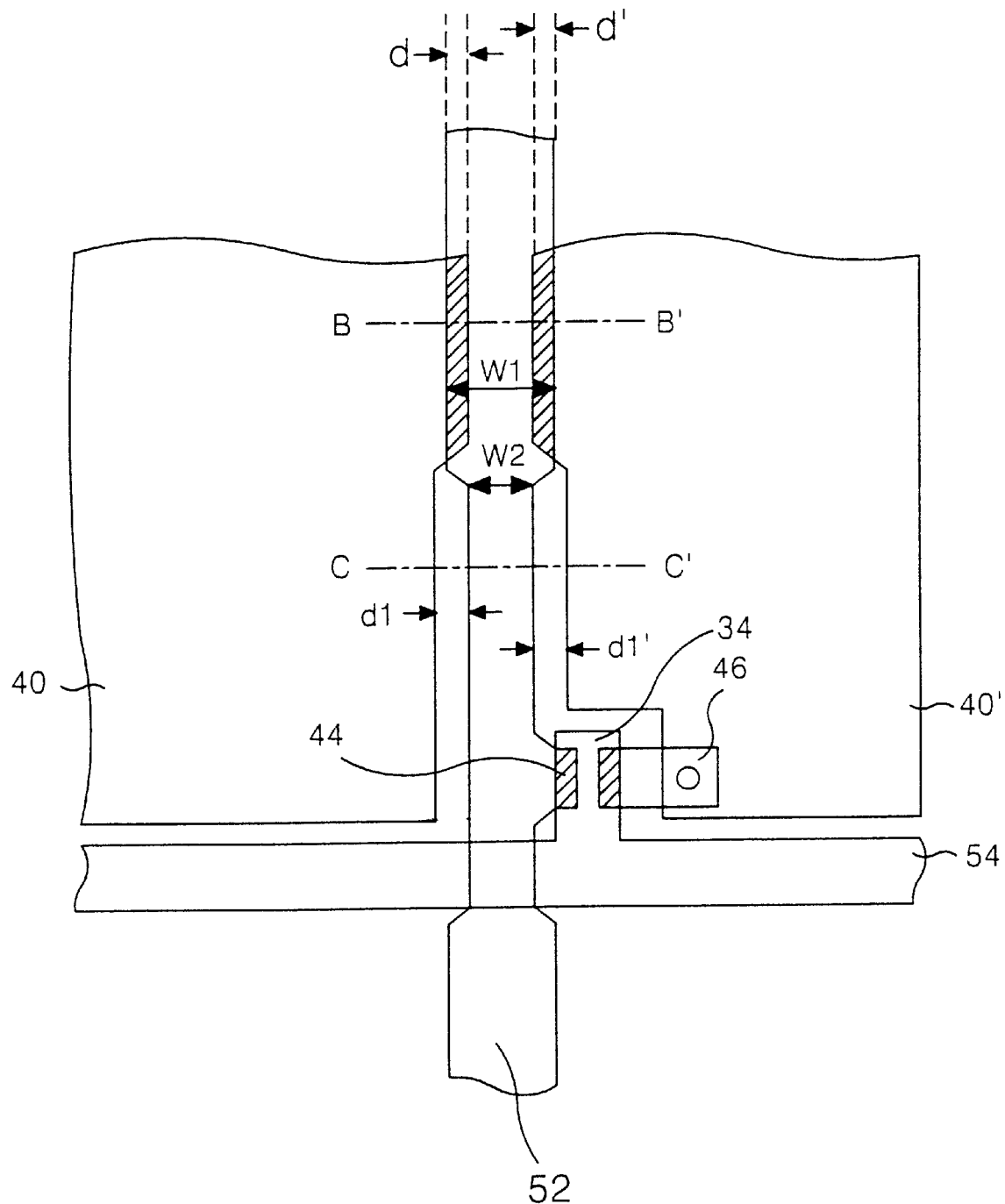
FIG. 3 is a plan view showing a structure of a liquid crystal display according to an embodiment of the present invention.
Figure 4:
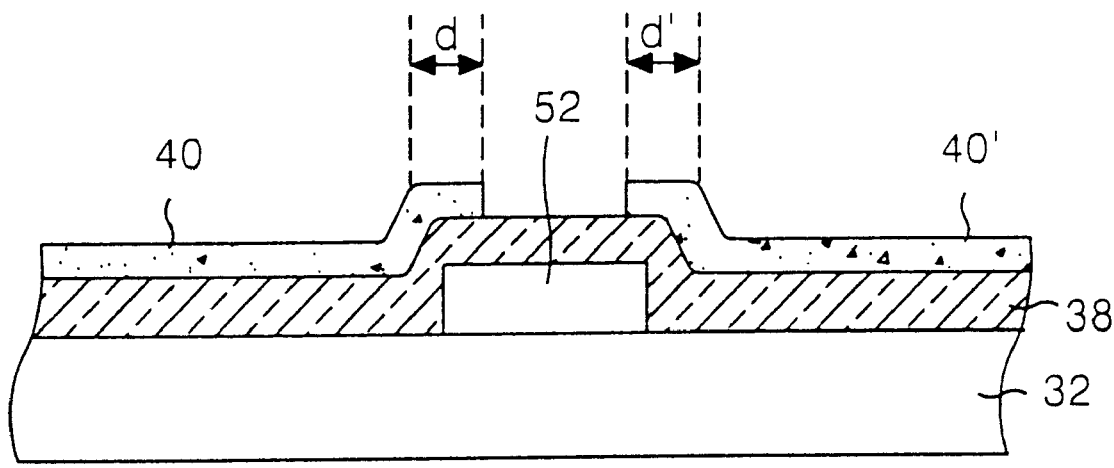
FIG. 4 is a sectional view of the liquid crystal display taken along the B–B' line in FIG. 3.
Figure 5:
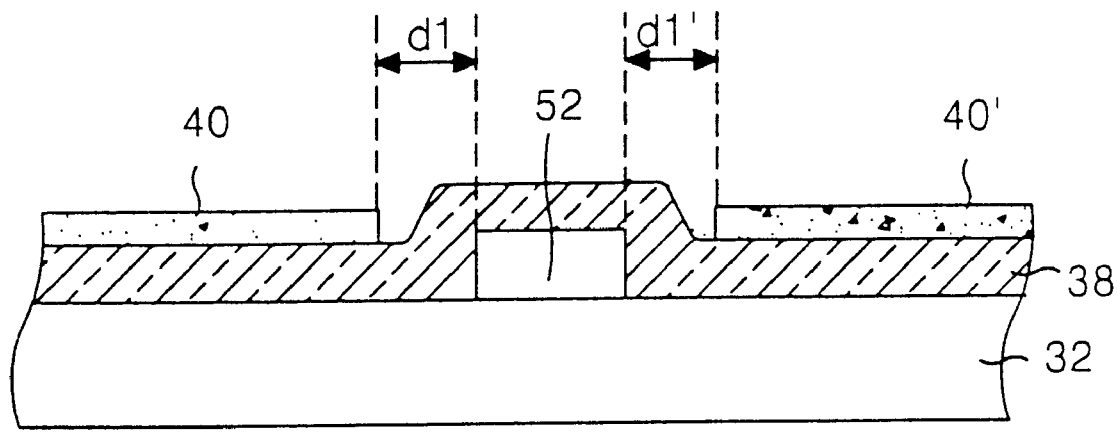
FIG. 5 is a sectional view of the liquid crystal display taken along the C–C' line in FIG. 3.

Referring to FIG. 3, there is shown a liquid crystal display (LCD) with a high aperture ratio according to an embodiment of the present invention. The LCD includes a data wire 52 formed in a dumbell-shaped structure, and pixel electrodes 40 and 40' overlapping partially with the data wire 52. The data wire 52 has a different width. As shown in FIG. 3, one portion of the data wire 52 has a first width W1 (e.g., 9.5 to 12.5 $\mu$m) while the other portion of the data wire 52 has a second width W2 (e.g., 8 to 10 $\mu$m). In this case, since the data wire 52 is formed to alternately have the first and second widths W1 and W2, it has a dumbell-shaped structure. At an area having the first width W1 of the data wire, the pixel electrodes 40 and 40' is formed in such a manner so as to overlap with both sides of the data wire 52 by desired distances d and d' (e.g., 1.5 to 2.5 $\mu$m). This will be described below in conjunction with FIG. 4. As shown in FIG. 4, the data wire 52 is formed at the upper portion of a substrate 32 to have the first width W1 (e.g., 9.5 to 12.5 $\mu$m). An active layer (not shown) is provided between the data wire 52 and the substrate 32. Next, a protective film 38 for electrically isolating the data wire 52 is formed on the data wire 52. The protective film 38 is made from $SiN_x$. The pixel electrode 40 is formed on the protective film 38 in such a manner so as to overlap with data wire 52 by desired distances d and d' (e.g., 1.5 to 2.5 $\mu$m). In this case, it is desirable that the overlapping distances d and d' between the data wire 52 and the pixel electrodes 40 and 40' are equal to each other. Thus, the overlapping areas of the pixel electrodes 40 and 40' formed on the data wire 52 become equal to each other. On the other hand, at an area having the second width W2 of the data wire, the pixel electrodes 40 and 40' are formed in such a manner so as to be spaced by desired distances d1 to d1' (e.g., 2 to 3 $\mu$m) from the data wire 52. This will be described below in conjunction with FIG. 5. As shown in FIG. 5, the data wire 52 is formed at the upper portion of a substrate 32 to have the second width W1 (e.g., 8 to 10 $\mu$m). An active layer (not shown) is provided between the data wire 52 and the substrate 32. Next, a protective film 38 for electrically isolating the data wire 52 is formed on the data wire 52. The protective film 38 is made from $SiN_x$. The pixel electrodes 40 and 40' are formed on the protective film 38 in such a manner so as to be spaced by desired distances d1 and d1' (e.g., 2 to 3 $\mu$m) from the data wire 52. In this case, it is desirable that the spaced distances d1 and d1' are equal to each other. In this case, capacitance of the pixel electrodes 40 and 40' positioned at both sides of the data wire 52 become equal by controlling the overlapping distances d and d' and the spaced distance d1 and d1'. Since the pixel electrodes 40 and 40' are overlapped at the upper portion of the data wire to have the same area, they have the same capacitance. At this time, since the capacitance of the pixel electrodes 40 and 40' overlapping with the data wire 52 are equal, they are cancelled by each other upon driving of the LCD having adverse affect on picture quality.

Accordingly, in the LCD with a high aperture ratio according to an embodiment of the present invention, a portion of the pixel electrode is overlapped with the data wire to have the same area to increase an aperture ratio in comparison to the convention LCD.

Figure 6:
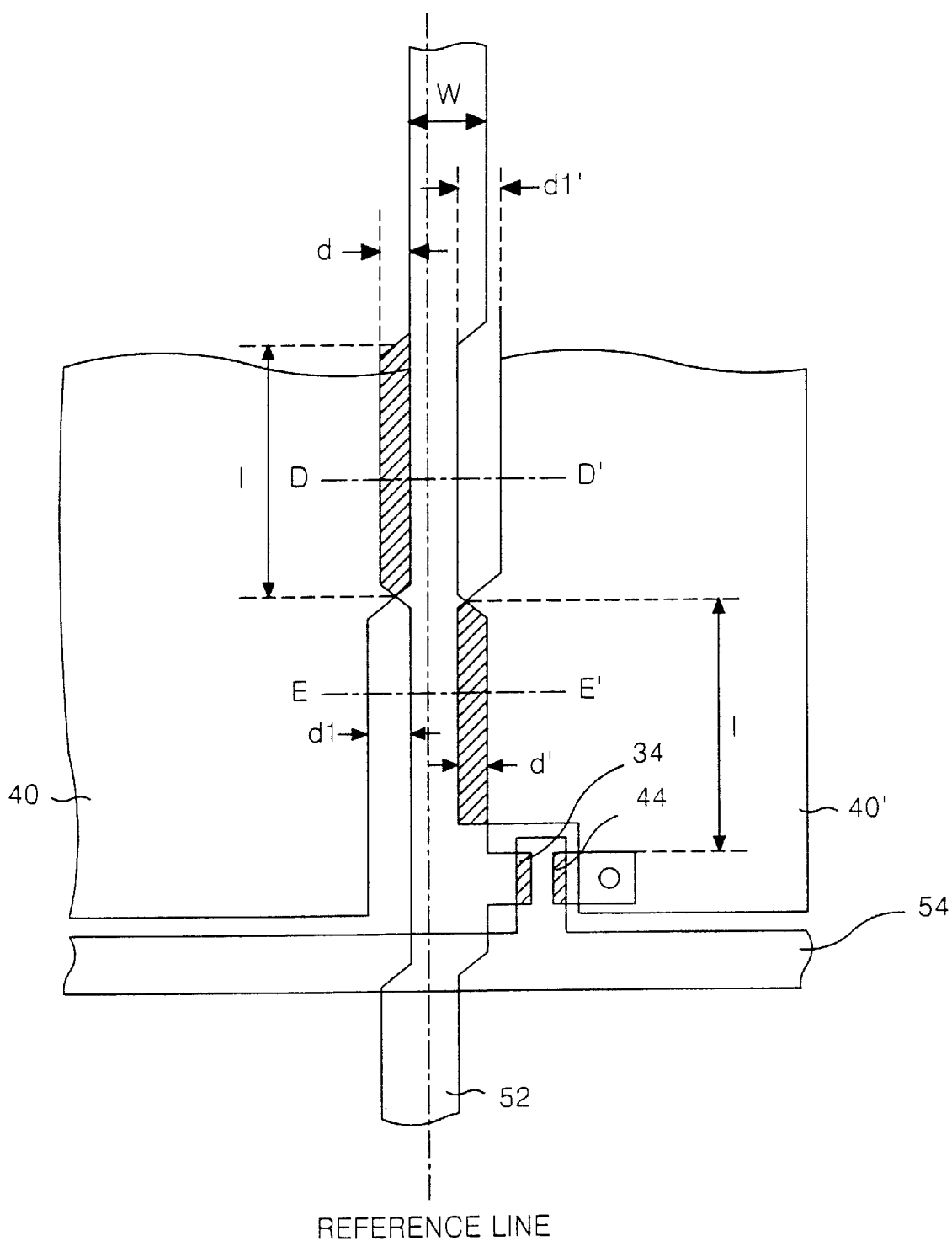
FIG. 6 is a plan view showing a structure of a liquid crystal display according to another embodiment of the present invention.
Figure 7:
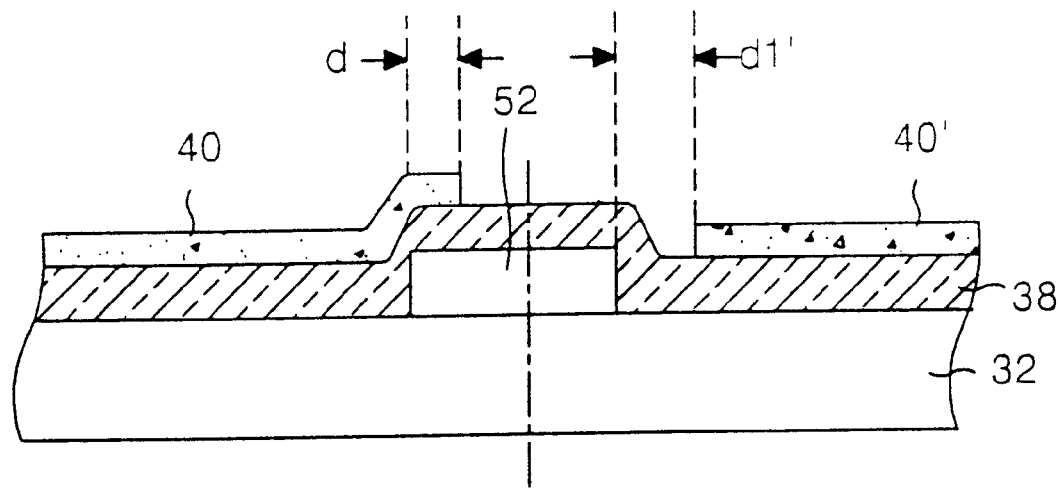
FIG. 7 is a sectional view of the liquid crystal display taken along the D–D' line in FIG. 6.
Figure 8:
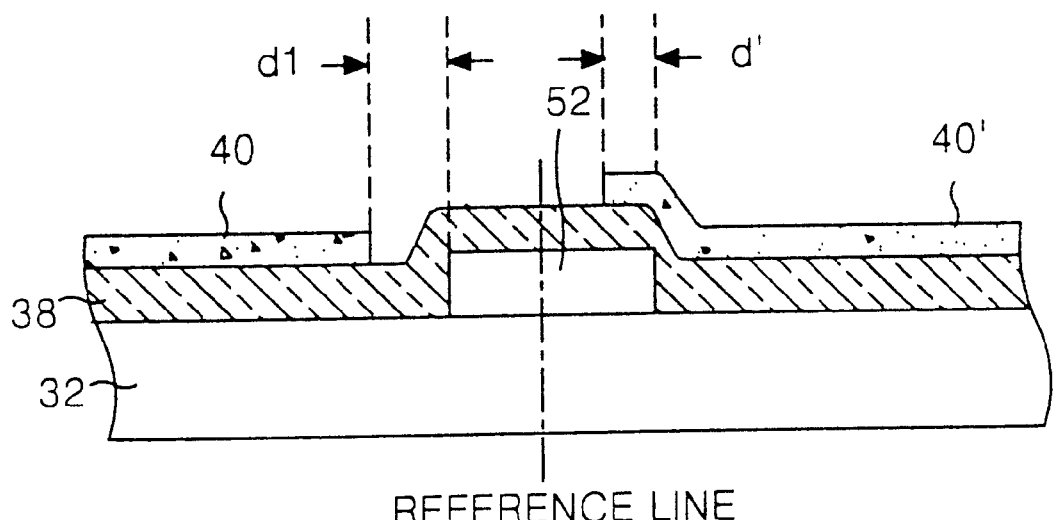
FIG. 8 is a sectional view of the liquid crystal display taken along the E–E' line in FIG. 6.

Referring to FIG. 6, there is shown a LCD with a high aperture ratio according to another embodiment of the present invention. The LCD includes a data wire 52 having a zigzag structure, and pixel electrodes 40 and 40' overlapping partially with the data wire 52. The data wire 52 has a certain width W (e.g., W2<W<W1). As shown in FIG. 6, the data wire 52 is shifted by a desired distance from a reference line to the left to have a desired length l and, at the same time, is shifted by a desired distance from the reference line to the right to have a desired length l. In this case, since the data wire 52 is formed repeatedly to be shifted to the left and right from the reference line. At an area shifted to the left from the data wire 52, the pixel electrode 40 is formed into a desired length in such a manner so as to overlap with a portion of the left side of the data wire 52 by a desired distance d (e.g., 1.5 to 2.5 $\mu$m) and the pixel electrode 40' is formed in such a manner so as to be spaced by a desired distance d1' (e.g., 2 to 3 $\mu$m) from a portion of the right side of the data wire 52. This will be described below in conjunction with FIG. 7. As shown in FIG. 7, the data wire 52 having a desired width W is formed at the upper portion of a substrate 32 to be shifted to the left from the reference line. An active layer (not shown) is provided between the data wire 52 and the substrate 32. Next, a protective film 38 for electrically isolating the data wire 52 is formed on the data wire 52. The protective film 38 is made from $SiN_x$. The pixel electrode 40 is formed on the protective film 38 in such a manner so as to be overlapped by a desired distance d at the left side of the data wire 52 and the pixel electrode 40' is formed on the protective film 38 in such a manner so as to be spaced by a desired distance d1' at the right side of the data wire 52. On the other hand, at an area shifted to the right from the data wire 52, the pixel electrode 40' is formed into a desired length in such a manner so as to overlap with a portion of the left side of the data wire 52 by a desired distance d' (e.g., 1.5 to 2.5 $\mu$m) and the pixel electrode 40 is formed in such a manner so as to be spaced by a desired distance d1 (e.g., 2 to 3 $\mu$m) at a portion of the right side of the wire 52. This will be described below in conjunction with FIG. 8. As shown in FIG. 8, the data wire 52 is formed at the upper portion of a substrate 32 to be shifted to the right from the reference line. An active layer (not shown) is provided between the data wire 52 and the substrate 32. Next, a protective film 38 for electrically isolating the data wire 52 is formed on the data wire 52. The protective film 38 is made from $SiN_x$. The pixel electrode 40' is formed on the protective film 38 in a manner such that it is overlapped by a desired distance d' at the right side of the data wire 52 and the pixel electrode 40 is formed on the protective film 38 in a manner such that it is spaced by a desired distance d1 at the right side of the data wire 52.

In this case, capacitance of the pixel electrodes 40 and 40' positioned at both sides of the data wire 52 become equal by controlling the overlapping distances d and d' and the spaced distance d1 and d1'. Since the pixel electrodes 40 and 40' are overlapped at the upper portion of the data wire to have the same area, they have the same capacitance. At this time, since the capacitance of the pixel electrodes 40 and 40' overlapping with the data wire 52 are equal, they are cancelled by each other upon driving of the LCD thus having no adverse affect on picture quality. Accordingly, in the LCD with a high aperture ratio according to an embodiment of the present invention, a portion of the pixel electrode overlapped with the data wire to have the same area to increase an aperture ratio in comparison to the convention LCD.

As described above, according to the present invention, an aperture ratio can be increased.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device with a high aperture ratio including a data wire provided at the upper portion of a substrate to transmit a data signal, said device comprising:

pixel electrodes, each having one side thereof consisting of a portion overlapping with the data wire and a portion spaced from the data wire in such a manner that overlapping areas at both sides of the data wire are equal to each other, said data wire being continuous and unbroken, and having a protruding part at said portion spaced apart from the data wire forming a source-to-gate connection.

2. The liquid crystal display device according to claim 1, wherein a protective film for electrically isolating the data wire from the pixel electrode is made from $SiN_x$.

3. A liquid crystal display device with a high aperture ratio, comprising:

a single, unbroken data wire formed to alternately have a first width and a second width, the first width being greater than the second width; and pixel electrodes formed in a manner such that they are overlapped by a desired distance at both sides of the data wire having the first width and to be spaced by a desired distance at both sides of the data wire having the second width.

4. The liquid crystal display device according to claim 3, wherein the first width is 9.5 to 12.5 $\mu$m.

5. The liquid crystal display device according to claim 3, wherein the second width is 8 to 10 $\mu$m.

6. The liquid crystal display device according to claim 3, wherein the overlapping distance between the data wire and the pixel electrode is 1.5 to 2.5 $\mu$m.

7. The liquid crystal display device according to claim 3, wherein the spaced distance between the data wire and the pixel electrode is 1.5 to 2.5 $\mu$m.

8. The liquid crystal display device according to claim 3, wherein a protective film for electrically isolating the data wire from the pixel electrode is made from $SiN_x$.

9. A liquid crystal display device with a high aperture ratio, comprising:

a data wire formed to be shifted by a desired distance to the left from a reference line and to be shifted by a desired distance to the right from the reference line;

a first pixel electrode formed in such a manner to overlap with the data wire shifted to the left by a desired distance and to be spaced by a desired distance from the data wire shifted to the right; and a second pixel electrode formed in such a manner to be spaced by a desired distance from the data wire shifted to the left and to overlap with the data wire shifted to the right by a desired distance.

10. The liquid crystal display device according to claim 9, wherein the overlapping length between the data wire and the first pixel electrode is equal to that between the data wire and the second pixel electrode.

11. The liquid crystal display device according to claim 9, wherein the overlapping distance between the data wire and the first or second pixel electrode is 1.5 to 2.5 $\mu$m.

12. The liquid crystal display device according to claim 9, wherein the spaced distance between the data wire and the first or second pixel electrode is 2 to 3 $\mu$m.

13. The liquid crystal display device according to claim 9, wherein a protective film for electrically isolating the data wire from the pixel electrode is made from $SiN_x$.

* * * * *

UNITED STATES PATENT AND TRADEMARK OFFICE
CERTIFICATE OF CORRECTION

PATENT NO. : 6,559,904 B1
DATED : May 6, 2003
INVENTOR(S) : Dong Yeung Kwak

It is certified that error appears in the above-identified patent and that said Letters Patent is hereby corrected as shown below:

<u>Title page,</u>
Item [73], Assignee, should read as follows:
-- Assignee: LG. Philips LCD Co., Ltd., Seoul (KR) --

Signed and Sealed this

Tenth Day of February, 2004

JON W. DUDAS
*Acting Director of the United States Patent and Trademark Office*